United States Patent
Qu

(10) Patent No.: US 10,263,910 B2
(45) Date of Patent: Apr. 16, 2019

(54) RESOURCE CALLING FOR HYBRID APPLICATIONS

(71) Applicant: Alibaba Group Holding Limited, George Town (KY)

(72) Inventor: Zishen Qu, Hangzhou (CN)

(73) Assignee: Alibaba Group Holding Limited (KY)

( * ) Notice: Subject to any disclaimer, the term of this patent is extended or adjusted under 35 U.S.C. 154(b) by 517 days.

(21) Appl. No.: 14/159,143

(22) Filed: Jan. 20, 2014

(65) Prior Publication Data

US 2014/0207851 A1  Jul. 24, 2014

(30) Foreign Application Priority Data

Jan. 23, 2013  (CN) .......................... 2013 1 0024460

(51) Int. Cl.
*G06F 9/54*   (2006.01)
*H04L 12/26*  (2006.01)
*H04L 12/911* (2013.01)

(52) U.S. Cl.
CPC ............ *H04L 47/781* (2013.01); *G06F 9/541* (2013.01); *H04L 43/10* (2013.01)

(58) Field of Classification Search
CPC ........ H04L 47/781; H04L 43/10; G06F 9/541
See application file for complete search history.

(56) References Cited

U.S. PATENT DOCUMENTS

| 5,701,451 | A    | 12/1997 | Rogers et al. | |
|-----------|------|---------|---------------|---|
| 6,988,280 | B2   | 1/2006  | Burnett       | |
| 8,060,556 | B2 * | 11/2011 | Krane         | G06F 9/4443 709/203 |
| 2003/0028798 | A1 * | 2/2003 | Burnett       | G06F 21/10 726/6 |
| 2011/0145807 | A1 * | 6/2011 | Molinie       | G06F 8/65 717/170 |
| 2012/0159308 | A1 * | 6/2012 | Tseng         | G06F 9/4443 715/234 |
| 2012/0220263 | A1   | 8/2012  | Smith et al.  | |
| 2012/0233600 | A1 * | 9/2012  | Uno           | G06F 11/3636 717/128 |
| 2012/0304082 | A1 * | 11/2012 | Patten        | G06F 3/04883 715/760 |

(Continued)

FOREIGN PATENT DOCUMENTS

CN    101453685 A    6/2009
WO    2002037325     5/2002

OTHER PUBLICATIONS

Sambasivan et al. "Generic framework for mobile application development." Internet (AH-ICI), 2011 Second Asian Himalayas International Conference on. IEEE, 2011.

*Primary Examiner* — George C Neurauter, Jr.
(74) *Attorney, Agent, or Firm* — Van, Pelt, Yi & James LLP

(57) ABSTRACT

Invoking a resource is provided, comprising: sending a page request message to a server; receiving page data sent back by the server in response to the page request message; analyzing the page data to obtain an address of the resource; generating a resource-calling request using the address of the resource; acquiring native version information of the application client; using the native version information of the application client to modify the resource-calling request; and acquiring the resource according to the modified resource-calling request.

22 Claims, 6 Drawing Sheets

(56) References Cited

U.S. PATENT DOCUMENTS

2013/0007102 A1 1/2013 Trahan et al.
2013/0128883 A1* 5/2013 Lawson .............. H04M 1/2473
370/352

* cited by examiner

RESOURCE CALLING FOR HYBRID APPLICATIONS

CROSS REFERENCE TO OTHER APPLICATIONS

This application claims priority to People's Republic of China Patent Application No. 201310024460.3 entitled A RESOURCE-CALLING METHOD, CLIENT, AND SYSTEM FOR HYBRID-APPLICATION CLIENTS, filed Jan. 23, 2013 which is incorporated herein by reference for all purposes.

FIELD OF THE INVENTION

The present application relates to the field of Internet technology. In particular, it relates to a resource-calling method, client, and system for hybrid-application clients.

BACKGROUND OF THE INVENTION

Hybrid application clients are now applied widely on mobile terminals because they have the advantage of both native app clients and web clients. A Hybrid application client appears to be a native application operating on a mobile terminal such as a smartphone, yet accesses a web page provided by a server.

FIG. 1 is a flowchart illustrating a process whereby a Hybrid application client provides service to a user in a conventional system.

At 101, a Hybrid application client uses a predetermined Universal Resource Locator (URL) as a basis for sending a HyperText Transport Protocol (HTTP) request including the URL to a server. In other words, the Hybrid application client accesses the page corresponding to the predetermined URL.

At 102, the server sends HyperText Markup Language (HTML) code (e.g., HTML 5 code) back to the Hybrid application client.

At 103, the Hybrid application client analyzes the HTML code and determines the JavaScript file or Cascading Style Sheet (CSS) file that the HTML code is going to call. Specifically, the HTML code includes the JavaScript identifier or CSS identifier which will be for calling. It is used to identify the JavaScript or CSS that is to be called.

At 104, the Hybrid application client acquires from the server the JavaScript or CSS that is to be called.

At 105, the Hybrid application client uses the acquired JavaScript or CSS to call the Application Programming Interface (API) native to the client.

At 106, the Hybrid application client uses the called API to activate the appropriate feature of the mobile terminal where it is located.

Because mobile terminal features cannot be enabled by simply one JavaScript or CSS, the API that is natively saved by the Hybrid application client is needed for enabling these features. Therefore, the Hybrid application client, to enable the appropriate functions of the mobile terminal where it is located, must acquire JavaScript or CSS based on the HTML code and then call the native API through the JavaScript or CSS which was acquired.

For example, the Hybrid application client provides a camera feature, which has a corresponding resource, namely a JavaScript file saved in the server is photoV2.0.js. This file provides parameters associated with the onboard camera, such as pixel size, maximum number of photos that can be taken with one click, etc. The API file saved in the Hybrid application client is photoV2.0.jar. Thus, the Hybrid application client first accesses the server page, determines that the JavaScript file, which the HTML5 code sent back by the server, is going to call photoV2.0.js, thus acquires photoV2.0.js from the server, and via photoV2.0.js calls its own Java functions photoV2.0.jar to enable the camera of the mobile terminal where the hybrid app is located.

To provide normal service by the hybrid app, the version of the Hybrid application client should be the same as the server's version. If the Hybrid application client's version is different from the server's version, the Hybrid application client will typically fail to provide service normally.

For example, the Hybrid application client provides a camera picture-taking feature. The Hybrid application client's version is V1.0, therefore the API saved on the Hybrid application client is photoV1.0.jar (the API version saved in the Hybrid application client is the same as the Hybrid application client's own version). If the server version is V2.0, then the JavaScript saved in the server is photoV2.0.js. Thus, the JavaScript that is to be called by the HTML5 code sent back by the server to the Hybrid application client is photoV2.0.js. After the Hybrid application client acquires photoV2.0.js, because photoV2.0.js can only call an API with the same version V2.0 (i.e., photoV2.0.jar), the version that is saved in the Hybrid application client is the V1.0 API (i.e., photoV1.0.jar). Consequently, the Hybrid application client cannot obtain an API with the corresponding version (V2.0) via photoV2.0.js, and therefore cannot provide the camera picture-taking feature normally.

Not every user will promptly update the Hybrid application client version installed on his or her mobile terminal. Therefore, in existing systems, to solve the aforesaid problem of the Hybrid application client not being able to provide service normally when the Hybrid application client and the server have different versions, the Hybrid application client can save all API JavaScript or CSS (JavaScript and CSS are collectively referred to below as "current resources") natively under its own current version. When the Hybrid application client receives HTML code sent back by the server, if it determines that the version of the current resource to be called by the HTML code is inconsistent with the native version of the hybrid app, it replaces the identifier of the current resource that is to be called in the HTML code with the identifier of the current resource of the natively saved version, analyzes the HTML code after the current resource identifier has been substituted, and calls the substituted current resource in order to achieve corresponding feature.

For example, the Hybrid application client provides a camera picture-taking feature. The Hybrid application client's version is V1.0, so the API saved on the Hybrid application client is photoV1.0.jar. In addition, the current resource (JavaScript) photoV1.0.js, which can call photoV1.0.jar, is saved in the Hybrid application client. The server version is V2.0, and the JavaScript file saved in the server is photoV2.0.js.

Thus, the JavaScript file that is to be called by the HTML code sent back by the server to the Hybrid application client is photoV2.0.js. When the Hybrid application client determines that the JavaScript identifier included in the HTML code is photoV2.0.js, it substitutes the natively saved photoV1.0.js identifier (which corresponds to the photoV2.0.js but whose version is different) for the photoV2.0.js identifier in the HTML code. It then analyzes the HTML code and calls the natively saved photoV1.0.js on the basis of the substituted identifier (the identifier for photoV1.0.js). It does not acquire resources from the server.

Finally, the Hybrid application client calls the natively saved photoV1.0.jar via photoV1.0.js so as to enable the camera feature of the mobile terminal.

However, in the existing scheme, the Hybrid application client needs to substitute the identifier for the photoV1.0.js that it saved for the photoV2.0.js identifier in the HTML code sent back by the server. This will alter the original structure of the HTML code. When the HTML code is HTML5, the substitution will invalidate the HTML5 code's own app cache feature and thus give rise to likely errors when subsequent web pages are loaded based on HTML code.

BRIEF DESCRIPTION OF THE DRAWINGS

Various embodiments of the invention are disclosed in the following detailed description and the accompanying drawings.

DETAILED DESCRIPTION

Figure 1:
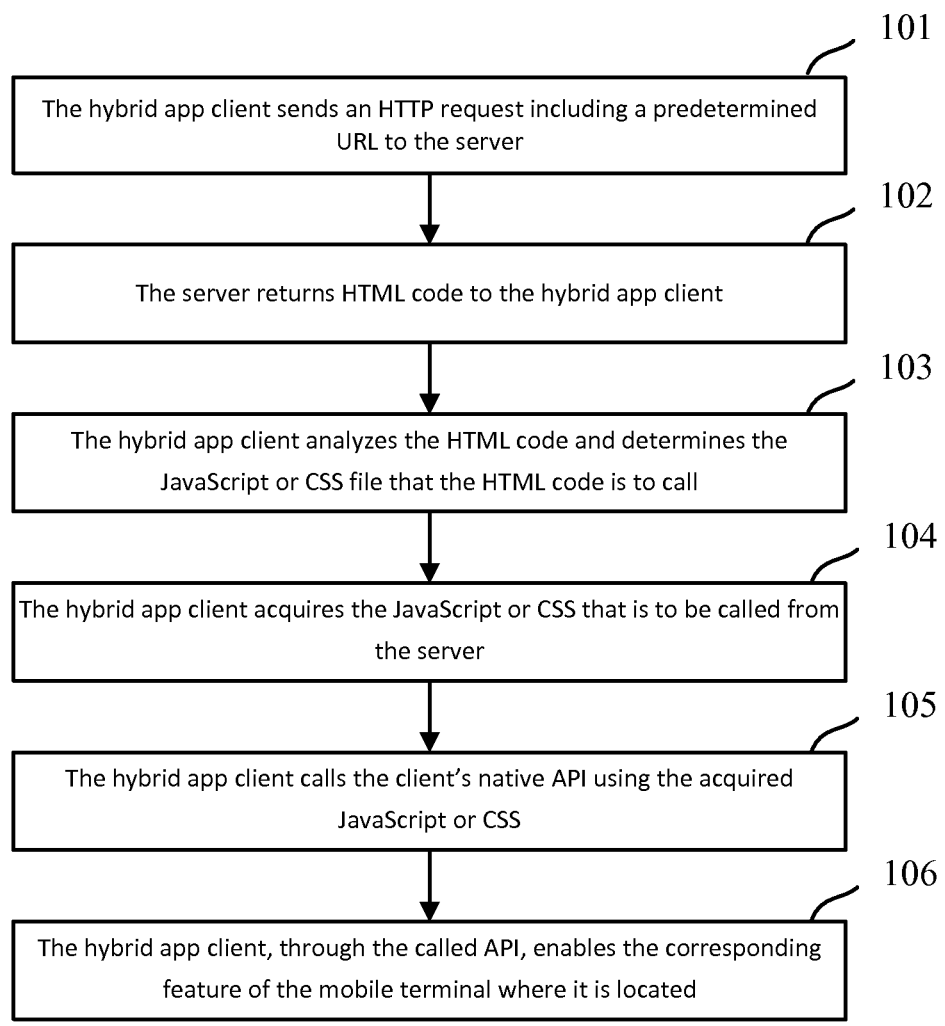
FIG. 1 is a flowchart illustrating a process whereby a Hybrid application client provides service to a user in a conventional system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A Hybrid application client refers to a non-browser application that appears to be a native application operating on a computer system (e.g., a smartphone, a tablet, a laptop, a wearable device, etc.) and that accesses a web page provided by a server in the course of providing functionalities. In some embodiments, the page data which a server sends to an application client includes an address of a resource that needs to be called (e.g., a location for a JavaScript file or CSS document). The page data is analyzed, and a resource-calling request is generated. The resource-calling request is modified in accordance with the native version information of the application client. The modified resource-calling request is used to acquire the resource. When the application client and the server have different versions, the technique enables the application client to provide service normally without modifying the page data, thus ensuring that subsequent web pages can be loaded normally based on the page data.

Detailed descriptions of embodiments of the present application are provided below in light of the drawings.

Figure 2:
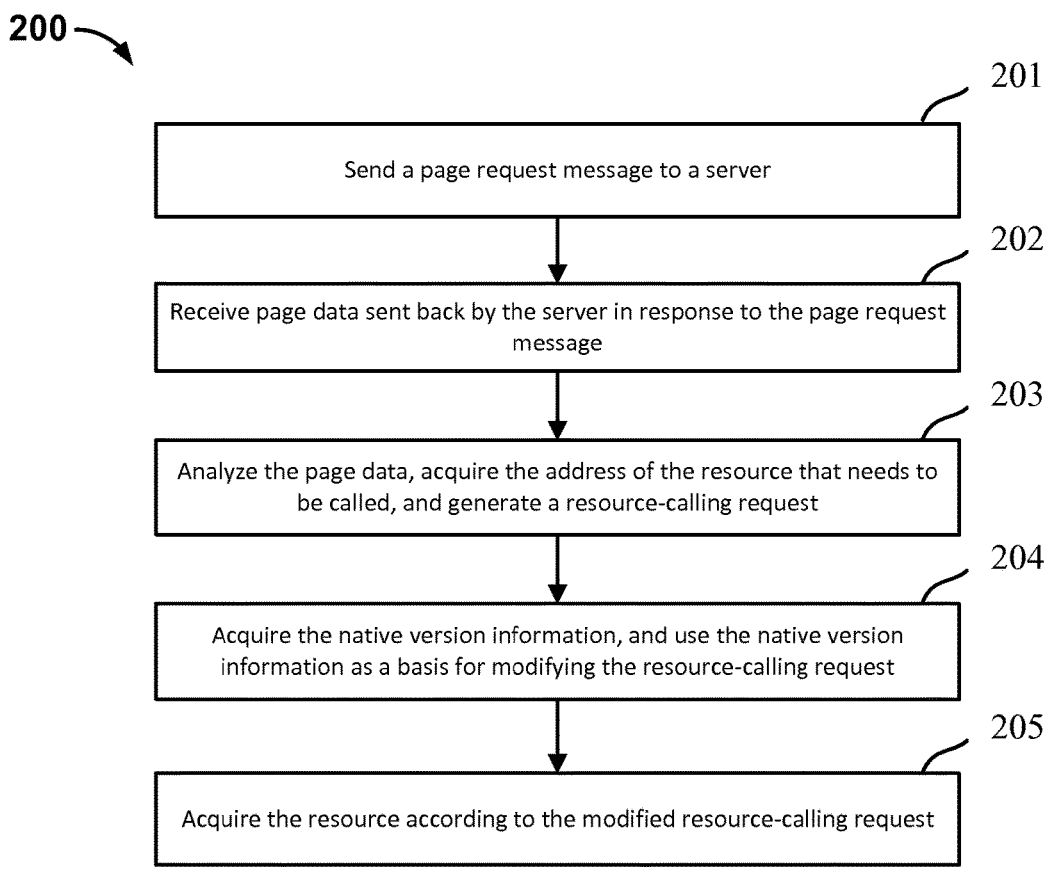
FIG. 2 is flowchart illustrating an embodiment of a process for an application client to exchange data with a server.

FIG. 2 is flowchart illustrating an embodiment of a process for an application client to exchange data with a server. Process 200 is performed by a Hybrid application client such as 700 of FIG. 7.

At 201, a page request message is sent to a server.

There are different ways for the client application to communicate with the server. In some embodiments, the Hybrid application client communicates with the server via webpage rendering facilities provided by the operating system (e.g., WebView provided by Android™). In some embodiments, the Hybrid application client includes code that invokes libraries and/or APIs that implement browser functions. For purposes of discussion, these different implementations of web browser functions are collectively referred to as plugins. When the client provides service, the plugin in the client first sends a page request message to the server based on a preset URL. It is used to acquire the web page corresponding to the URL from the server. The server is a network server. The page request message includes an HTTP request message.

At 202, page data sent back by the server in response to the page request message is received.

After the server receives the page request message, it sends back to the client the page data for the web page corresponding to the URL included in the page request message.

In order to realize page-specific features, the page data includes information concerning the resource that is to be called. An example of such information is the address of the resource, which can be expressed as a native address on the client (e.g., as a file directory location). Resources include support resources (also referred to as frontend resources) that are needed to execute specific native features (e.g., code/library implementing picture-taking and voice-enabled features).

In some embodiments of the present application, this address includes the resource name and a version placeholder.

In this example, the page data sent back by the server is HTML code. The address included in the HTML code may be a source address (also referred to as a source path). The HTML code may be HTML5 code.

For example, the server can send back HTML code according to a preset protocol. The returned HTML code is formatted as follows:

```
<html>
<body> service code </body>
<script type="text/javascript"src="http://localhost:50000/photo${VERSION}.js"></script>
</html>
```

The HTML code described above includes a source path, i.e., http://localhost:50000/photo${VERSION}.js. This path is the address used to obtain the resource that is to be called by the HTML code described above (in this case, the resource is a Javascript file). The source path is organized in the form of a URL, wherein "localhost:50000" represents the native port number of the client, "photo" is the resource name, and "${VERSION}" is the version placeholder. The format of the source path can be different in other embodiments and can be defined by developers of the client/server applications.

At 203, the page data is analyzed, the address of the resource that needs to be called is acquired, and a resource-calling request is generated.

To continue with the above example, after the client receives the aforesaid page data via its plugin, the page data is analyzed. The analysis finds <script type="text/javascript"src="http://localhost:50000/photo${VERSION}.js"></script>, that means that the resource that the above-described HTML code is to call needs to be acquired from the address described above (i.e., the source path of "http://localhost:50000/photo${VERSION}.js"). Therefore, the client's plugin generates a resource-calling request and sends it to the above address. This request is used to acquire the resource that needs to be called from this address. This resource-calling request includes the above-described address. This resource-calling request may also be an HTTP request message, such as "GET http://localhost:50000/photo${VERSION}.js."

At 204, the native version information is acquired, and the native version information is used as a basis for modifying the resource-calling request. As used herein the native version information refers to the version information of the application client as it appears on the client device. In some embodiments, the application client includes an API or function call to acquire the native version information. The native version information can be obtained by reading a configuration file or a registry, as well as any other appropriate technique.

In some embodiments, a built-in module is included in the Hybrid application client. The built-in module includes code configured to monitor and receive the resource-calling request, and is implemented using one or more processes, routines, functions, libraries, classes, and/or other appropriate programming code. To continue with the above example, when the client sends the resource-calling request to the above address http://localhost:50000/photo${VERSION}.js, the port "localhost:50000" in the above address indicates the native port of the client. Therefore, the resource-calling request still will be received by the client itself. Specifically, the built-in module in the client monitors the native port at the client having the port number 50000 and receives the resource-calling request. The port number may have been agreed upon in advance with the server and can be any appropriate number.

In some embodiments, each application client registers when it initializes. For example, on initialization, the application client can make an HTTP GET request to the address of http://localhost:50000, where the request includes predefined fields specifying the name of the application client, the native version information of the client and its resources, and any other appropriate information. The built-in module monitoring the port will receive the registration information, records the registration information for the later application client, and responds as appropriate. A successful response from the built-in module indicates to the application client that a built-in module is already running and can be used directly, without having to activate another built-in module.

After the built-in module receives the resource-calling request, it uses the resource-calling request to learn which resource is to be called. The built-in module further uses the current native version information to modify the received resource-calling request. In some embodiments, the built-in module takes the client's native version information and writes it into the resource-calling request.

In this example, since the resource-calling request includes the address of the resource that needs to be called and this resource address includes the resource name and a version placeholder, the resource-calling request also includes the name and the version placeholder for the resource. An example of a resource-calling request is "HTTP GET http://localhost:50000/photo${VERSION}.js." Therefore, the client's built-in module substitutes the acquired native version information of the client for the version placeholder included in the resource-calling request.

Assuming that the client's current version is V1.0, the resource address included in the resource-calling request becomes the following after the version placeholder is replaced with V1.0:"http://localhost:50000/photoV1.0.js." Therefore, the required resource "photoV1.0.js" can be acquired based at least in part on this address.

In addition, the version placeholder described above can further be used to identify the resource that is to be called as a restricted resource. A restricted resource refers to a resource with version restrictions. When the resource version information included in the resource-calling request is different from the client's native version information, the resource-calling request cannot call the resource if the resource is a restricted resource. In some embodiments, the application client determines whether a resource is a restricted resource according to a list maintained on the device. Therefore, in some embodiments, monitoring the resource-calling requests includes assessing whether or not the resource-calling request includes a version placeholder and, when the resource-calling request includes the version placeholder, replacing the version placeholder with the native version information of the client.

At 205, the resource is acquired according to the modified resource-calling request.

To continue with the above example, because the resource address included in the modified resource-calling request is "http://localhost:50000/photoV1.0.js," the client's built-in module uses the modified address to acquire photoV1.0.js. When acquiring the resource according to the modified address, the client's built-in module can acquire the appropriate resource (such as photoV1.0.js in the example above) natively from the client on the basis of the resource name (such as "photo" in the example above) and the client's current native version information (such as V1.0 in the example above) included in the modified address. In some embodiments, the built-in module is configured to look for the resource at a preconfigured location, such as "//client/resources." Thus, the built-in module will look for a resource file at the path of "//client/resources/photo/V1.0."

In some embodiments, the address of the resource included in the HTML code sent back by the server to the client includes, in addition to the name and version placeholder for the resource that is to be called, one or more storage locations for various resources stored on the server (e.g., <script type="text/javascript"src="http://localhost:50000/photo${VERSION}.js" serverpath="//server/resources"></script>). If the client has not saved the corresponding resource natively and thus the resource cannot be found on the client, the corresponding resource photoV1.0.js is acquired from the server according to the storage locations used to store the resources on the server that are included in the modified address (e.g., "//server/resources/photo/V1.0"). The resource that is acquired from the server is saved natively on the client in preparation for future access by other callers.

After the client's built-in module acquires the resource "photoV1.0.js" from either the client or the server, the client sends the resource photoV1.0.js to the plugin for the plugin to call functions in the resource.

In some embodiments, a restricted resource (i.e., a resource with version restrictions) may be packaged on the client side and the page data sent back by the server does not designate the version information with respect to the restricted resource. Rather, a version placeholder is set up within the page data. The client analyzes the page data, and the built-in module monitors the resource-calling request. A resource-calling request that includes the version placeholder indicates that the resource called by the resource-calling request is a restricted resource. The built-in module acquires the native version information for the client and uses the client's native version information as a substitute for the version placeholder in the resource-calling request.

By using the technique described above, the client does not need to revise the page data after receiving it. Instead, after analyzing the page data, the application client generates a resource-calling request based on the address included in the page data and sends the request. Because this address is a native address of the client, the resource-calling request can be monitored and received by the client's built-in module. The built-in module modifies the version placeholder included in the resource-calling request that it receives. That is, what the client modifies is the resource-calling request which it receives and sends following the analysis of the page data, and is not the page data itself. When the client and server have different versions of a resource, the client can call a resource compatible with the current version of the client without having to modify the page data. It then provides service normally and because the page data has not been modified, web pages can be loaded by the plugin normally in the future on the basis of the page data.

In addition, in existing systems, the client needs to modify the HTML code sent back by the server and then load the modified HTML code using the client's own plugin. Consequently, how the page is loaded (also referred to as the loading mode of the page) is also modified. In addition, modified HTML code versus direct loading with the server's URL address will destroy the unity of the request for loading the resources (for example, the original HTML code originated with the server and has the path "http://protocol," but the modified HTML code originates from the client itself and has a path of "file://protocol"). Such a change in the loading mode will result in HTML5 standard app cache and other features being unavailable. However, if a process similar to 200 is performed, the unity of page data sources will not be destroyed because the client does not modify the page data sent back by the server. When the page data includes HTML code, the client app will not destroy the features relating to the HTML5 standard's strict requirements concerning loading modes.

In addition, using the technique described above, the server does not need to know whether the client's current version is consistent with the server's version. That is, the client's version information is transparent with respect to the server. Even if the client and server have different versions, the client still can perform process 200 described above to call the resource and realize the feature within the page.

In the embodiment of the present application, the mobile terminal may have multiple application clients installed. A built-in module as is described above may be added to each installed application client. In some embodiments, the built-in module is implemented as a process that communicates with one or more other application client processes. To reduce the load on the mobile terminal, if one application client enables its own built-in module, then this built-in module can handle resource-calling requests for other application clients in addition to handling its own resource-calling requests.

In some embodiments, at least a first application client and a second application client share a built-in module. In the following discussion it is assumed that the first application client is initiated before the second application client. Thus, if the first application client's built-in module has been enabled, the second application client can call resources using the enabled built-in module of the first application client.

As discussed above, in some embodiments, each application client sends registration information to a designated port at initialization time. The first application client receives registration information sent by the second client and saves the current version of the second application client that is included in the registration information. Subsequently, upon receiving a resource-calling request sent by the second application client, the first application client modifies the version placeholder included in the address in the resource-calling request to the saved current version of the second application client and uses the address included in the modified resource-calling request as a basis for acquiring the corresponding resource and sending back the acquired resource to the second client.

The second application client, when employing process 200 to conduct exchanges with the server, may execute steps 201 through 203 using the second application client's own plugin and assess whether the current mobile terminal has another application client with an enabled built-in module. When the second application client receives a successful response from a built-in module within a certain amount of time and determines that the first application client's built-in module has already been enabled, the second application client uses the enabled built-in module in the first client to execute resource calling. When the resource-calling request received by the first client's built-in module includes the identifier for the second client, the first client can determine that this resource-calling request was sent by the second client. Therefore, after the first client acquires the appropriate resource, the first client sends back the resource to the plugin of the second client, as shown in FIG. 3.

Figure 3:
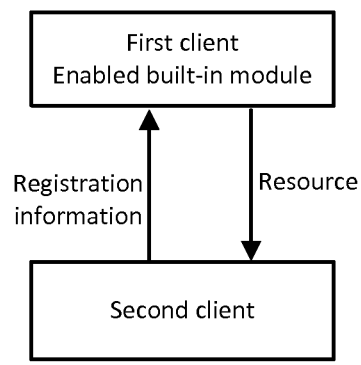
FIG. 3 is a diagram illustrating an embodiment of a system comprising two application clients.

FIG. 3 is a diagram illustrating an embodiment of a system comprising two application clients. In this example, a second application client sends registration information to a first application client. In FIG. 3, the second application client employs a "heartbeat" approach to send to the first application client registration information including the second application client's current version information and the second client's identifier. That is, the second application client periodically sends registration information to the first application client. Specifically, the second application client sends registration information using the following message:

HTTP GET http://localhost:50000/register_token/app-name/version.

In the registration information described above, "app-name" is the identifier for the second application client; "version" is the current version information for the second application client.

After the first application client receives the registration information, the first application client's own built-in module responds to the registration information and sends back the response to the second application client. Therefore, the second application client only needs to determine whether it receives the response from an application's (i.e., the first application client's) built-in module within a specified length of time. If so, then the second application client will conclude that the first application client's built-in module has been enabled. If the second application client determines that the built-in module of the first application client has been enabled, then the second application client does not need to enable its own built-in module but can execute the resource-calling step via the first application client's built-in module.

Figure 4:
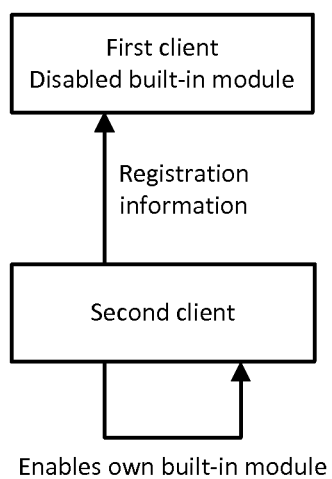
FIG. 4 is a diagram illustrating another embodiment of a system comprising two application clients.

FIG. 4 is a diagram illustrating another embodiment of a system comprising two application clients. In this example, a second application client enables its own built-in module when the built-in module of the first application client is not enabled. Specifically, the second application client sends the registration information in the "heartbeat" mode and receives no response within a specified length of time. Thus, the second application client determines that the built-in module in another application client is not enabled, and therefore enables the second application client's own built-in module to remedy the deficiency.

With the technique described above, the mobile terminal needs only one application client to enable its own built-in module for other application clients to be serviced by the built-in module. It does not require the built-in modules of all the application clients to be enabled. This technique can reduce stress on the mobile terminal.

In addition, in the embodiment of the present application, the senders of page request messages to the server include, in addition to the Hybrid application client, the mobile terminal's own browser or other types of application clients. Therefore, in step 202 shown in FIG. 2, before the server sends back to the application client the page data including the application client's native address, the application client's type can be confirmed as a specified type according to a specified field in the page request message that is received. Specifically, the server can, on the basis of a "UAgent" field or other added field in the received page request message, assess whether the type of application client that sent the page request message is a hybrid app (e.g., if "UAgent" is set to 1, then the sender application client is a hybrid app). If it is, then it sends back the page data including the native address of the application client. If it is not, then it sends back normal page data.

The above is the resource-calling method for a hybrid app, as provided by embodiments of the present application. Embodiments of the present application also provide a Hybrid application client and a resource-calling system, as shown in FIGS. 5 and 6.

Figure 5:
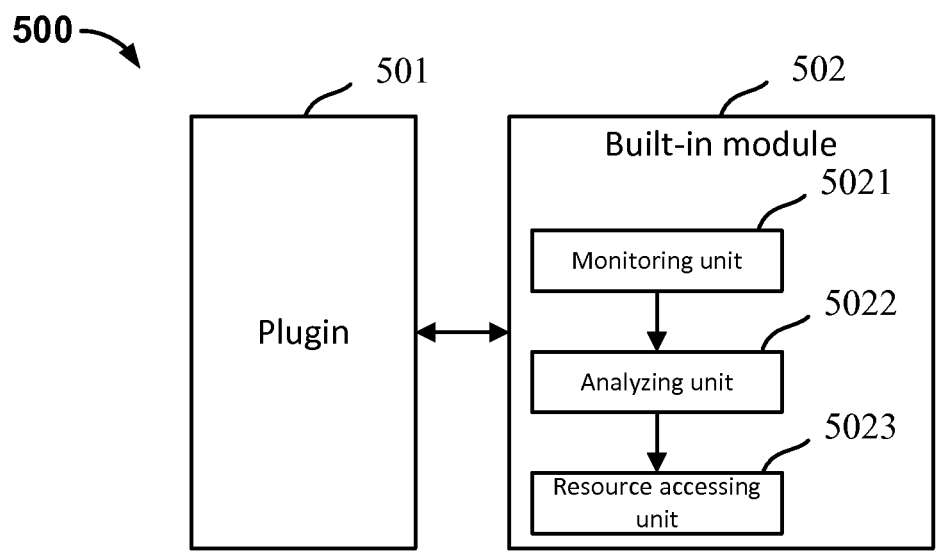
FIG. 5 is an architectural diagram illustrating a Hybrid application client provided by an embodiment of the present application.
Figure 6:
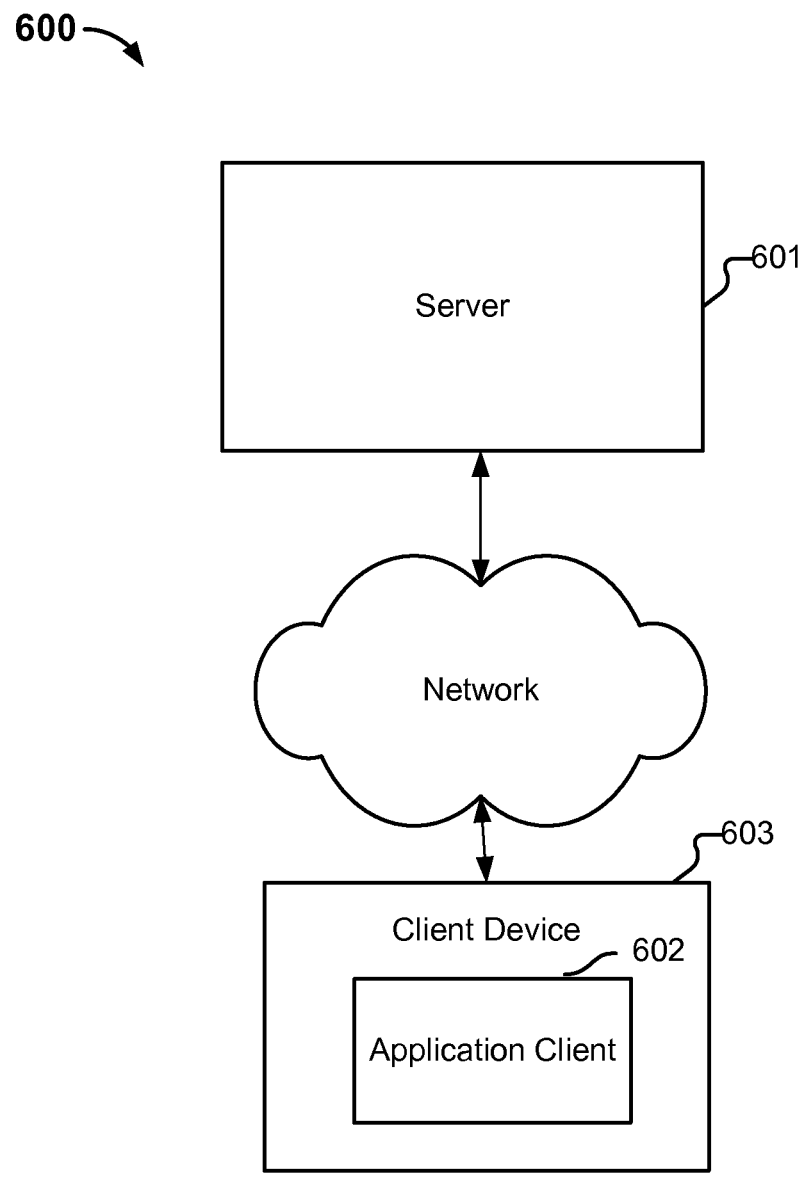
FIG. 6 is a system diagram of an embodiment of a resource-calling system according to the present application.

FIG. 5 is an architectural diagram illustrating a Hybrid application client provided by an embodiment of the present application. In this example, Hybrid application client 500 comprises a plugin 501 configured to page request messages to the server, receive page data sent back by the server in response to the page request messages, analyze the page data, acquire the addresses of the resources that need to be called, and generate resource-calling requests.

Hybrid application client 500 further comprises a built-in module 502, which comprises a monitoring unit 5021, an analyzing unit 5022, and a resource accessing unit 5023. Monitoring unit 5021 is configured to monitor the resource-calling requests generated by the plugin. Analyzing unit 5022 is configured to acquire the native version information of the application client and use the native version information of the application client as a basis for modifying the resource-calling request monitored by said monitoring unit. Resource accessing unit 5023 is configured to acquire resources according to modified resource-calling requests and send back the acquired resources to said plugin.

In this example, the page data received from the server includes HyperText Markup Language (HTML) code, which in turn includes the address of the resource that needs to be called. The address includes the name and version placeholder of the resource that needs to be called. The version placeholder identifies the resource as a restricted resource. Analyzing unit 5022 determines whether the resource-calling request monitored by monitoring unit 5021 includes a version placeholder, and when the resource-calling request does include a version placeholder, the current version information of the application client is substituted for the version placeholder.

Resource accessing unit 5023 is configured to acquire the corresponding resource natively and, on the basis of the resource name and version information included in the modified resource-calling request, acquire the corresponding resource from the server when the corresponding resource has not been saved natively, and save the acquired resource natively.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The units may be implemented on a single device or distributed across multiple devices. The functions of the units may be merged into one another or further split into multiple subunits.

FIG. 6 is a system diagram of an embodiment of a resource-calling system according to the present application. In this example, system 600 comprises a server 601 and a client device 603. The client device can be any appropriate computer system, including a smartphone, a tablet, a laptop, a wearable device, etc. One or more application clients 602 execute on the client device. The server and the client device communicate over a network such as the Internet.

Server 601 is configured to receive page request messages sent by application client 602 and send back page data to application client 602 according to the page request messages.

Application client 602 is configured to receive page data sent back by server 601, analyze the page data, acquire addresses of resources that need to be called, and generate resource-calling requests. The application client is further configured to acquire the native version information of the application client 602, use the native version of the application client to modify resource-calling requests that are received, and acquire resources according to modified resource-calling requests.

Figure 7:
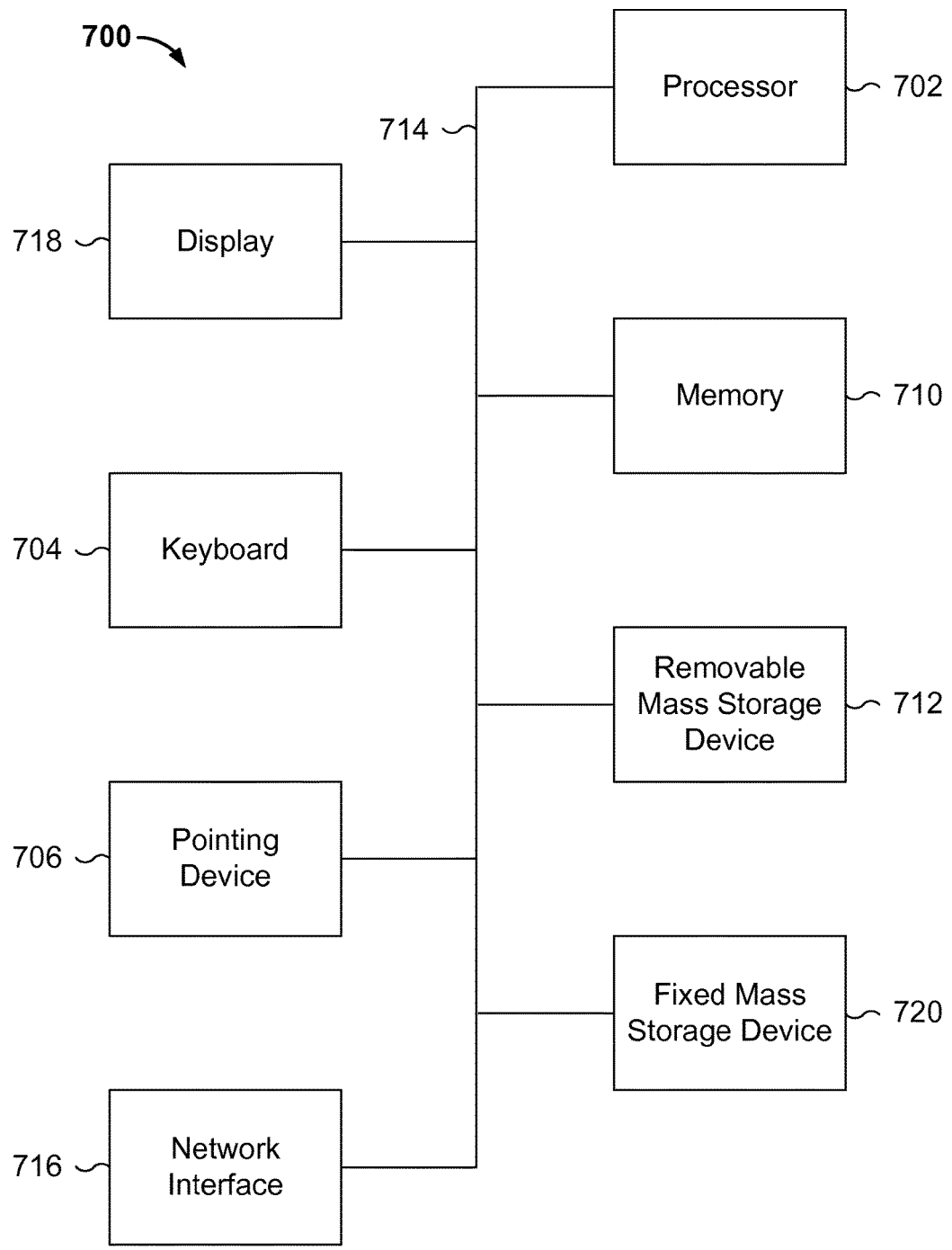
FIG. 7 is a functional diagram illustrating a programmed computer system for executing resource calling in accordance with some embodiments.

FIG. 7 is a functional diagram illustrating a programmed computer system for executing resource calling in accordance with some embodiments. As will be apparent, other computer system architectures and configurations can be used to perform resource calling. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718). In some embodiments, processor 702 includes and/or is used to provide resource calling functions.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage 712, 720 generally store additional programming instructions, data, and the like that typically are not in active use by the processor 702. It will be appreciated that the information retained within mass storage 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor/touchscreen 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

The embodiments of the present application provide a resource-calling technique. According to this technique, the client receives page data which is sent by the server and includes the address of the resource that needs to be called. The client analyzes the page data and generates a resource-calling request. The client uses the native version information of the client as a basis for modifying this resource-calling request and acquires the resource according to the modified resource-calling request. When the above technique is employed, normal service can be provided without having to modify the page data when the client and the server have different versions. Thus, it can ensure that subsequent pages are loaded normally.

A person skilled in the art should understand that the embodiment of the present application can be provided as methods, systems or computer software products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) including computer operable program codes.

The present application is described with reference to flow charts and/or block diagrams based on methods, equipment (systems) and computer program products. Please note that each flow process and/or block diagram within the flowcharts and/or block diagrams and combinations of flow processes and/or block diagrams within the flowcharts and/or block diagrams can be realized by computer commands. One can provide these computer commands to a general-purpose computer, a specialized computer, an embedded processor or the processor of other programmable data processing equipment so as to give rise to a machine, with the result that the commands executed through the computer or processor of other programmable data processing equipment give rise to a device that is used to realize the functions designated by one or more processes in a flow chart and/or one or more blocks in a block diagram.

These computer program commands can also be stored on specially-operating computer-readable storage devices that can guide computers or other programmable data processing equipment, with the result that the commands stored on these computer-readable devices give rise to commodities that include command devices. These command devices realize the functions designated in one or more processes in a flow chart and/or one or more blocks in a block diagram.

These computer program commands can also be loaded onto a computer or other programmable data processing equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for invoking a resource, comprising:
sending a page request message to a server;
receiving page data sent back by the server in response to the page request message, wherein the page data includes a path corresponding to an address of a resource to be called by an application client, the path including a resource name and a version placeholder of a version of the application client to be used to call the resource that is identified in the page data;
analyzing the page data to obtain the path corresponding to the address of the resource;
generating, using one or more computer processors, a resource-calling request using the path corresponding to the address of the resource;
acquiring native version information of the application client to be used to call the resource that is identified in the page data;
modifying the resource-calling request based at least in part on the native version information of the application client, wherein modifying the resource calling request includes replacing the version placeholder included in the page data with the native version information of the application client to be used to call the resource that is identified in the page data in response to determining that a current version of the application client is different from the version of the application client to be used to call the resource included in the page data received from the server; and
acquiring the resource according to the modified resource-calling request, wherein the acquiring the resource comprises acquiring the resource using the application client corresponding to native version information that is used in connection with replacing the version placeholder included in the page data.

2. The method of claim 1, wherein the page data includes HyperText Markup Language (HTML) code, and the HTML code includes the address of the resource.

3. The method of claim 1, wherein the version placeholder indicates that the resource is a restricted resource.

4. The method of claim 1, wherein modifying the resource-calling request comprises:
monitoring the resource-calling request;
determining whether the resource-calling request includes the version placeholder; and
in response to determining that the resource-calling request includes the version placeholder, replacing the version placeholder with the native version information of the application client.

5. The method of claim 1, wherein acquiring the resource according to the modified resource-calling request comprises using a resource name and the native version information included in the modified resource-calling request to acquire the resource.

6. The method of claim 1, wherein acquiring the resource according to the modified resource-calling request comprises:
attempting to acquire a corresponding resource from the application client natively on a device executing the application client; and
in response to determining that the corresponding resource is not successfully acquired on the device, acquiring the corresponding resource from the server and saving the acquired corresponding resource natively on the device.

7. The method of claim 1, wherein the application client is a first application client; and the method further comprises:
receiving registration information sent by a second application client;
saving current version information of the second application client, the current version information being included in the registration information; and
upon receiving a resource-calling request sent by the second application client:
modifying a version placeholder included in an address included in the resource-calling request sent by the second application client to a saved current version of the second application client;
using the address included in the modified resource-calling request sent by the second application client to acquire a corresponding resource; and
sending the acquired corresponding resource to the second application client.

8. The method of claim 1, wherein the address includes a monitored port on a client device on which the application client executes.

9. The method of claim 1, wherein the version placeholder is a field included in a Uniform Resource Locator (URL).

10. The method of claim 1, wherein using the native version information of the application client to modify the resource calling request includes replacing the version placeholder with information for calling the application corresponding to the native version information.

11. The method of claim 1, wherein:
the client terminal replaces the version placeholder included in the page data with the native version information of the application client to be used to call the resource that is identified in the page data, and
the client replaces the version placeholder included in the page data in a manner that is transparent to the server.

12. The method of claim 1, further comprising:
determining whether the resource calling request comprises information pertaining to a restricted resource based at least in part on locally stored list of restricted resources,
wherein the resource calling request is modified in response to determining that the resource calling request comprises information pertaining to a restricted resource.

13. The method of claim 1, wherein the modifying the resource-calling request based at least in part on the native version information of the application client modifies the resource calling request without modifying the page data received from the server.

14. A resource-calling system, comprising:
one or more processors configured to:
send a page request message to a server;
receive page data sent back by the server in response to the page request message, wherein the page data includes a path corresponding to an address of a resource to be called by an application client, the path including a resource name and a version placeholder of a version of the application client to be used to call the resource that is identified in the page data;
analyze the page data to obtain the path corresponding to the address of the resource;
generate a resource-calling request using the path corresponding to the address of the resource;
acquire native version information of the application client to be used to call the resource that is identified in the page data;
modify the resource-calling request based at least in part on native version information of the application client, wherein to modify the resource calling request includes to replace the version placeholder included in the page data with the native version information of the application client to be used to call the resource that is identified in the page data in response to determining that a current version of the application client is different from the version of the application client to be used to call the resource included in the page data received from the server; and
acquire the resource according to the modified resource-calling request, wherein the acquiring the resource comprises acquiring the resource using the application client corresponding to native version information that is used in connection with replacing the version placeholder included in the page data; and
one or more memories coupled to the one or more processors, configured to provide the one or more processors with instructions.

15. The system of claim 14, wherein the page data includes HyperText Markup Language (HTML) code, and the HTML code includes the address of the resource.

16. The system of claim 14, wherein the version placeholder indicates that the resource is a restricted resource.

17. The system of claim 14, wherein to modify the resource-calling request comprises to:
monitor the resource-calling request;
determine whether the resource-calling request includes the version placeholder; and
in response to a determination that the resource-calling request includes the version placeholder, replace the version placeholder with the native version information of the application client.

18. The system of claim 14, wherein to acquire the resource according to the modified resource-calling request comprises to use a resource name and the native version information included in the modified resource-calling request to acquire the resource.

19. The system of claim 14, wherein to acquire the resource according to the modified resource-calling request comprises to:
attempt to acquire a corresponding resource from the application client natively on a device executing the application client; and
in response to determining that the corresponding resource is not successfully acquired on the device, acquire the corresponding resource from the server and save the acquired corresponding resource natively on the device.

20. The system of claim 14, wherein the application client is a first application client; and the one or more processors are further configured to:
receive registration information sent by a second application client;
save current version information of the second application client, the current version information being included in the registration information; and
upon receiving a resource-calling request sent by the second application client:
modify a version placeholder included in an address included in the resource-calling request sent by the second application client to a saved current version of the second application client;

use the address included in the modified resource-calling request sent by the second application client to acquire a corresponding resource; and send the acquired corresponding resource to the second application client.

21. The system of claim 14, wherein the address includes a monitored port on a client device on which the application client executes.

22. A computer program product for invoking a resource, the computer program product being embodied in a non-transitory computer readable storage medium and comprising computer instructions for:

sending a page request message to a server;

receiving page data sent back by the server in response to the page request message, wherein the page data includes a path corresponding to an address of a resource to be called by an application client, the path including a resource name and a version placeholder of a version of the application client to be used to call the resource that is identified in the page data;

analyzing the page data to obtain the path corresponding to the address of the resource;

generating a resource-calling request using the path corresponding to the address of the resource;

acquiring native version information of the application client to be used to call the resource that is identified in the page data;

modifying the resource-calling request based at least in part on the native version information of the application client, wherein modifying the resource calling request includes replacing the version placeholder included in the page data with the native version information of the application client to be used to call the resource that is identified in the page data in response to determining that a current version of the application client is different from the version of the application client to be used to call the resource included in the page data received from the server; and acquiring the resource according to the modified resource-calling request, wherein the acquiring the resource comprises acquiring the resource using the application client corresponding to native version information that is used in connection with replacing the version placeholder included in the page data.

* * * * *